United States Patent
Betz et al.

(10) Patent No.: US 7,228,251 B2
(45) Date of Patent: Jun. 5, 2007

(54) ANGULAR RATE SENSOR HAVING A VIBRATION GYROSCOPE

(75) Inventors: Uwe Betz, Burg Gräfenrode (DE); Heinz-Werner Morell, Kaiserslautern (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/562,584

(22) PCT Filed: Jun. 8, 2004

(86) PCT No.: PCT/EP2004/051054
§ 371 (c)(1),
(2), (4) Date: Dec. 28, 2005

(87) PCT Pub. No.: WO2005/001383
PCT Pub. Date: Jan. 6, 2005

(65) Prior Publication Data
US 2006/0195290 A1 Aug. 31, 2006

(30) Foreign Application Priority Data
Jun. 30, 2003 (DE) ............... 103 29 500

(51) Int. Cl.
*G01P 3/00* (2006.01)
*G06F 15/00* (2006.01)
(52) U.S. Cl. .................... 702/145
(58) Field of Classification Search ......... 702/56, 702/116, 117, 104, 145, 182; 73/503.3, 494, 73/504.12
See application file for complete search history.

(56) References Cited

U.S. PATENT DOCUMENTS

| 5,226,321 A | 7/1993 | Varnham et al. |
| 5,313,835 A | 5/1994 | Dunn |
| 5,617,176 A | 4/1997 | Matsuzawa et al. |
| 5,826,204 A | 10/1998 | Ulm |
| 6,647,301 B1 * | 11/2003 | Sederlund et al. ............ 700/79 |
| 2005/0022596 A1 * | 2/2005 | Lehureau et al. ......... 73/504.12 |

FOREIGN PATENT DOCUMENTS

| DE | 43 40 719 | 6/1995 |
| DE | 42 42 557 | 10/1997 |
| EP | 0 461 761 | 6/1994 |
| EP | 1 189 025 | 3/2002 |

* cited by examiner

*Primary Examiner*—Bryan Bui
(74) *Attorney, Agent, or Firm*—Cohen Pontani Lieberman & Pavane LLP

(57) ABSTRACT

The invention relates to an angular rate sensor having a vibration gyroscope, in which circuits are provided for operating the vibration gyroscope and for deriving an angular rate signal. The circuits access modifiable data, whereby this data is stored in a writable non-volatile memory. The data from the non-volatile memory is read after the angular rate sensor is switched on.

8 Claims, 1 Drawing Sheet

| IC | C1 | C2 | ............................ | Cn | ChSC |
| IP | P1 | P2 | ............................ | Pn | ChSP |
| IL | L1 | L2 | ............................ | Ln | ChSL |
| SW Emulation Program | | | | | |

ANGULAR RATE SENSOR HAVING A VIBRATION GYROSCOPE

CROSS-REFERENCE TO RELATED APPLICATIONS

This is a U.S. national stage of application No. PCT/EP2004/05 1054, filed on 8 Jun. 2004. Priority is claimed on the following application: Country: Germany, Application No.: 103 29 500.3, Filed: 30 Jun. 2003.

BACKGROUND OF THE INVENTION

The invention relates to a rotation rate sensor having a vibration gyro with circuits which are used for operation of the vibration gyro and for emission of a rotation rate signal and which access variable data, having a nonvolatile memory which can be written to and in which the data is stored, and having means for reading the data from the nonvolatile memory after switching on the rotation rate sensor, with the data being subdivided into groups on the basis of its use, and measures for data protection being taken for in each case one group.

By way of example, U.S. Pat. No. 5,226,321 discloses rotation rate sensors in which a vibration gyro is excited on two axes which are aligned radially with respect to a major axis, for which purpose a primary and a secondary control loop having appropriate transducers are provided on the vibration gyro. These control loops may include various analog and digital circuits, with the analog circuits and the vibration gyro having tolerances, so that adjustment is necessary, at least during the production of the rotation rate sensor. The individual circuits then access the stored data during subsequent operation.

Furthermore, EP 1 189 025 A2 and U.S. Pat. No. 5,313,835 have disclosed data such as this being stored in an EEPROM. For safety reasons, the data is stored in a duplicated (redundant) form in EP 1 189 025 A2, so that the correctness of the data that is read can be checked by comparison. In addition, only one data storage process is provided during the production of the rotation rate sensor.

In the case of a rotation rate sensor which has been disclosed in U.S. Pat. No. 5,826,204, a non-volatile memory is provided in an associated electronic controller and has written to it table values which change as the "learning success" of the controller progresses. There is therefore fundamentally a risk that, in poor circumstances, incorrect data may also be written to the volatile memory.

Furthermore, it may be necessary to match characteristics of the rotation rate sensor to the respectively intended purpose, for example by presetting parameter sets for filters.

SUMMARY OF THE INVENTION

The rotation rate sensor according to the invention is characterized in that the memory is arranged such that the data for in each case one group can be written and read independently of the data of the other groups, and in that a checksum is formed over the data for in each case one group, is stored in the non-volatile memory, and is used for checking during reading. The non-volatile memory is preferably an EEPROM or a flash EEPROM.

The invention makes it possible to write the data in each of the individual groups to the non-volatile memory, and to edit it, in a mutually independent manner, at different times. By way of example, the adjustment data can thus be stored in the nonvolatile memory towards the end of the production process, while parameter sets which relate to the use of the rotation rate sensor, for example the vehicle type in which the rotation rate sensor is intended to be installed, are stored later, by the user.

All of the data which in any way governs the operation of the rotation rate sensor can be stored in the non-volatile memory. In particular, provision is made in the case of the rotation rate sensor according to the invention for the adjustment data and/or parameter sets for filters and/or value limits for self-testing of the rotation rate sensor to be stored.

One development of the rotation rate sensor according to the invention comprises a software emulation program also being stored in the non-volatile memory.

BRIEF DESCRIPTION OF THE DRAWINGS

The invention allows numerous embodiments. One of these will be described in the following text and is illustrated schematically in a number of figures in the drawing, in which.

DETAILED DESCRIPTION OF THE PREFERRED EMBODIMENTS

Figures 1, 2:
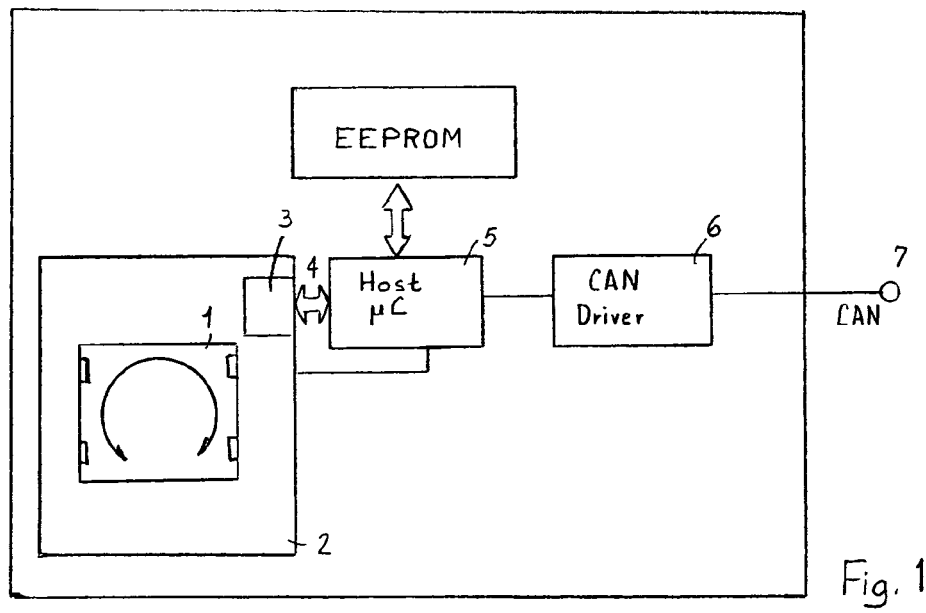
FIG. 1 is a block diagram of a rotation rate sensor according to the invention.
FIG. 2 shows, schematically, the content of the non-volatile memory.

The example of use shown in FIG. 1 represents a rotation rate sensor for a motor vehicle, having a vibration gyro 1 which is part of a sensor module 2. This has a series of circuits for operation of the vibration gyro and for evaluation of the signals from the vibration gyro, including, among other items, a microcomputer 3 which is connected via an SPI bus 4 to a further microcomputer 5, which is also referred to in the following text as a host. The rotation rate information is passed from here via a CAN bus driver 6 to a CAN bus 7 for passing onto other systems in the motor vehicle. Data is stored in an EEPROM 8, is read when the rotation rate sensor is switched on, and is kept available in random access memories for the microcomputers 3 and 5 for access during operation.

Since this is not necessary for understanding of the invention, the vibration gyro 1 and the sensor module 2 will not be explained in any more detail. Since the rotation rate sensor is relevant to safety, monitoring is provided for correct operation of the microcomputers 3, 5, in particular the program execution.

FIG. 2 shows the data stored in the EEPROM 8, in a highly simplified form. For example, adjustment data items C1 to Cn are thus stored with an associated identifier IC and a checksum ChSC. Various parameters P1 to Pn for setting filters are stored in the EEPROM 8, and these likewise have an associated identifier IP and a checksum ChSP.

For safety reasons, monitoring is carried out continuously in the rotation rate sensor during operation, for example by variables being monitored to determine whether they have overshot or undershot their value ranges. The limits of these value ranges may differ from one application to another. Limits L1 to Ln such as these are therefore likewise stored with an associated identifier IL and a checksum ChSL in the EEPROM 8. Finally, a program for software emulation is also stored in the EEPROM 8.

The invention claimed is:

1. A rotation rate sensor comprising a vibration gyro and a plurality of circuits used for operating the vibration gyro and emitting a rotation rate signal, the plurality of circuits including a non-volatile memory being readable and writable to and storing data including variable data, the plurality of circuits further comprising means for reading the data from the non-volatile memory after switching on the rotation rate sensor, wherein the data is subdivided into groups based on use of the data, the non-volatile memory including measures for signal protection for each of the groups, the data in each of the groups being readable and writable to independently of the data in the other ones of the groups, and a checksum is formed for the data in each of the groups and stored in the volatile memory, the checksum being usable for checking the data during reading.

2. The rotation rate sensor of claim 1, wherein said non-volatile memory comprises an EEPROM.

3. The rotation rate sensor of claim 1, wherein said non-volatile memory comprises a flash EEPROM.

4. The rotation rate sensor of claim 1, wherein one of the groups includes adjustment data for the rotation rate sensor.

5. The rotation rate sensor of claim 1, wherein one of the groups includes parameter sets for filters.

6. The rotation rate sensor of claim 1, wherein one of the groups includes value limits for self-testing of the rotation rate sensor.

7. The rotation rate sensor of claim 1, wherein a software emulation program is also stored in the non-volatile memory.

8. The rotation rate sensor of claim 1, wherein parameter sets of data that relate to a specific application of the rotation rate sensor are writable to by a user after a production process.

* * * * *